Aug. 3, 1937. L. W. JORDAN 2,088,961
BRANCH PIPE FITTING AND METHOD OF MAKING THE SAME
Filed March 14, 1934

Inventor
Leon W. Jordan
By Arthur J. Robert
Attorney

Patented Aug. 3, 1937

2,088,961

UNITED STATES PATENT OFFICE 2,088,961

BRANCH PIPE FITTING AND METHOD OF MAKING THE SAME

Leon W. Jordan, Louisville, Ky.

Application March 14, 1934, Serial No. 715,456

8 Claims. (Cl. 29—157)

This invention relates to branch pipe fittings composed of tubing.

Due to the increasing use of copper, steel and other tubing for plumbing and other purposes, there has been a growing demand for branch pipe fittings composed of a similar material. Up to the present time, however, no satisfactory fitting composed of tubing has been produced. The various fittings of this character heretofore proposed have failed to meet requirements either because of their inherent weakness structurally or because of their excessive manufacturing cost. Consequently, users of copper tubing, for example, have been compelled to resort to cast fittings composed of brass, etc.

The principal object of this invention is to produce an inexpensive fitting which is composed of tubing but which, nevertheless, has a requisite strength and sturdiness.

Another object is to provide a simple, inexpensive and easily performed method of connecting tubular parts to form a fitting of this character.

A further object is to provide a fitting of this character, the construction of which involves a minimum of labor and material.

I have found that a branch pipe fitting composed of tubing and having a high degree of strength can be made by joining the tubular parts in such manner that their mutually contacting surfaces are respectively held under compression and tension similarly to that of the corresponding parts of a riveted joint. Generally stated, the invention consists in inserting one end of a tubular branch into the branch opening of a tubular runner, expanding the inner end of the branch so that its joint surface extends along the joint surface of the runner and then substantially expanding the branch proper into engagement with the runner. The last mentioned expansion step is preferably effected on the projecting portion of the branch and carried out in such manner as to expand the branch over the outer edge of the opening. This method produces what may be termed a riveted joint inasmuch as the last expansion step operates, by drawing the joint surface of the branch up tightly against and over the corresponding joint surface of the runner, to place the runner and branch joint surfaces respectively under substantially uniform compression and tension in much the same manner as that which obtains when two parts are joined by rivets.

The invention is illustrated in the accompanying drawing, wherein.

Figure 1:
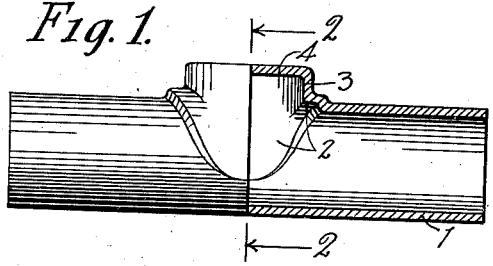
Figure 1 is a view, partly in elevation and partly in section, illustrating the first step of one method which is suitable for use in forming a runner with a branch opening.
Figure 2:
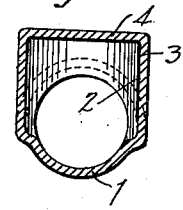
Figure 2 is a section on line 2—2 of Figure 1.

In carrying out the invention, the tube or runner utilized for the fitting may be fashioned in any suitable shape and formed by any of the various well-known methods now employed in work of this general nature. For example, a cylindrical runner 1 may be used and its central upper portion expanded in any suitable manner to provide an off-set or recessed joint surface 2 and a neck 3 as shown in Figures 1 and 2. The term "joint surface" is herein used respectively to designate the mutually contacting surfaces of the runner and branch. While it is not necessary, it is desirable that the joint surface 2 of the runner be off-set or recessed as shown, and preferably to an extent approximately equal to the thickness of the metal in the branch tubing which is to be connected to the runner. By having the joint surface 2 off-set in this manner, it will be obvious that the passageway in the finished article will not be obstructed by the inserted end of the branch. It should also be understood that the formation of the neck, while not strictly necessary, is highly desirable since it increases the area of the joint surface 2. An increase in this area produces a greater contact area in the joint itself, thereby proportionately increasing the rigidity of the structure and its ability to withstand the pressures to which it may be subjected. The type of expansion utilized, which is merely illustrative of one way of forming the runner, produces a neck 3 having a closed end or cap 4. This cap may be removed or cut off either during the expansion of the runner or subsequently thereto, and the runner thus conditioned to receive the branch 5.

Figure 3:
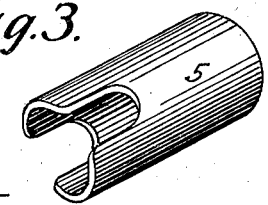
Figure 3 is a perspective of a branch ready for insertion into the runner.
Figure 4:
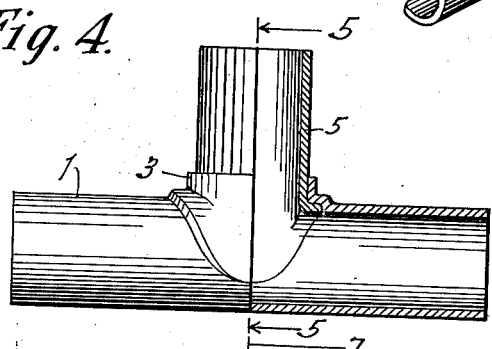
Figure 4 is a view, partly in elevation and partly in section, showing the fitting after the branch has been inserted into the runner and its inserted or inner end expanded.
Figure 5:
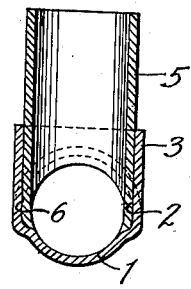
Figure 5 is a section on line 5—5 of Figure 4.

The branch 5 which is of the cylindrical form shown in Figure 3 is next inserted into the runner through the neck 3 and its inserted or inner end expanded as shown in Figures 4 and 5. The expansion of the inner end of the branch may be accomplished in any suitable manner as by introducing into the runner a cylindrical mandrel which fits tightly against the unrecessed portion of the runner and then forcing the inner end of the branch over the mandrel into the recess between the mandrel and the joint surface 2. The inserted end of the branch 5 preferably is forked to facilitate its expansion by the mandrel and the fork preferably shaped so that the joint surface 6 provided by the forked end of the branch will conform to the joint surface 2 of the runner 1.

Figure 6:
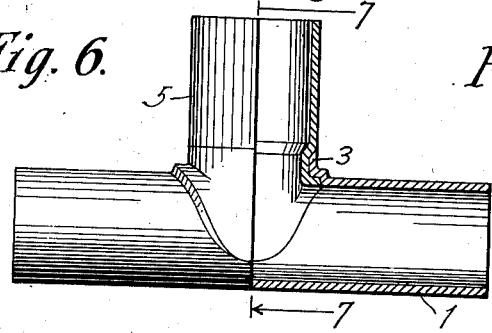
Figure 6 is a view, partly in elevation and partly in section, showing the fitting after the projecting portion of the branch has been expanded.
Figure 7:
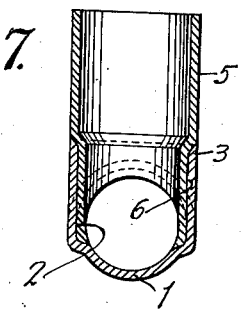
Figure 7 is a section on line 7—7 of Figure 6.
Figure 8:
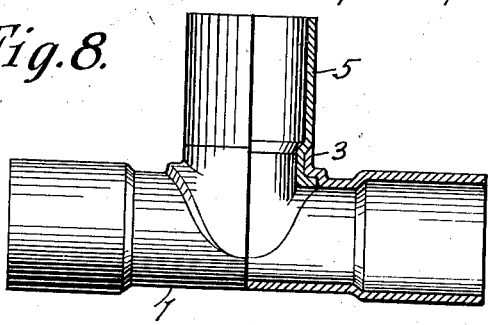
Figure 8 is a view, partly in elevation and partly in section, of the finished product.

Now, in order to tighten or rivet the joint, the branch proper is expanded into engagement with the neck 3, preferably over and into uniform contact with the outer edge of the neck as shown in Figures 6 and 7. This causes the metal in the neck portion of the branch to flow outwardly over the neck and thus draws the entire joint surface 6 of the branch up tightly against the joint surface 2 of the runner, placing the runner and branch joint surfaces respectively under substantially uniform compression and tension thereby producing a strong, rigid and leak-tight joint. The ends of the runner may now be expanded to desired size as shown in Figure 8 if such ends were originally undersized as the previous figures are intended to indicate. Furthermore, the fitting may be further treated by soldering, brazing or welding the joint. It should be understood, however, that such further treatment is not essential, inasmuch as I have found that a very effective joint can be made simply by "riveting" the joint in the manner stated.

From the foregoing, it will be readily appreciated that the method of connecting the branch to the runner not only can be easily and quickly performed, but that its use involves a minimum of labor and materials and produces a strong and sturdy article. Furthermore, while the invention has been illustrated in connection with the formation of a T, it is, of course, applicable to the formation of crosses and other types of branches all of which are intended for use in plumbing and other work or in work using pipes for structural or ornamental purposes.

Having described my invention, I claim:—

1. A method of connecting a branch to a runner having a branch opening through which the branch extends consisting in expanding the inner end of said branch and then expanding the branch proper into engagement with the runner sufficiently to draw the joint surface of the branch tightly against the joint surface of the runner and to place the latter surface under compression.

2. A method of connecting a branch to a runner having a branch opening through which the branch extends consisting in expanding the inner end of said branch and then expanding the branch over the outer edge of said opening sufficiently to draw the joint surface of the branch tightly against the joint surface of the runner and to place the latter surface under compression.

3. A method of forming a branch pipe fitting consisting in providing a runner with a necked opening, inserting a branch in said runner through said opening, expanding the inner end of said branch and then expanding the branch over the outer edge of said neck sufficiently to draw the joint surface of the branch tightly against the joint surface of the runner and to place the latter surface under compression.

4. A method of forming a branch pipe fitting consisting in providing a runner with a branch opening, the inner or joint surface of said runner adjacent said opening being off-set outwardly to provide a recess, inserting a branch in said opening, expanding the inner end of said branch so as to force its joint surface into said recess, and then expanding the branch over the outer edge of said opening so as to draw the joint surface of said branch up tightly against the joint surface of said runner.

5. A method of forming a branch pipe fitting consisting in providing a runner with a necked opening, the inner surface of said runner adjacent said opening being off-set outwardly to provide a recess, inserting a branch into said runner through said necked opening, expanding the inner end of said branch so as to force it into said recess, and then expanding the branch over the outer edge of said necked opening so as to draw the joint surface of said branch up tightly against the joint surface of said runner.

6. A branch pipe fitting comprising a runner having a branch opening, the inner joint surface of said runner being off-set outwardly to provide a recess, and a branch extending into said opening with its inner end expanded into said recess, said branch being expanded over the outer edge of said opening sufficiently to place the joint surface of said branch and runner respectively under tension and compression.

7. A branch pipe fitting comprising a runner having a necked branch opening, the inner joint surface of said runner adjacent said opening being off-set outwardly to provide a recess, and a branch having a forked end extending into said opening, the forks of which are expanded into said recess, said branch being expanded over the outer edge of said opening sufficiently to place the runner and branch joint surfaces respectively under compression and tension.

8. A method of forming a branch pipe fitting consisting in providing a runner with a necked opening, inserting the forked end of a branch into said runner through said opening, expanding the forked end of said branch over the inner end of said neck during the insertion operation and then expanding the branch over and into uniform contact with the outer end of the neck sufficiently to place the runner and branch joint surfaces respectively under substantially uniform compression and tension.

LEON W. JORDAN.